US010795111B2

(12) United States Patent
Han et al.

(10) Patent No.: US 10,795,111 B2
(45) Date of Patent: Oct. 6, 2020

(54) CAMERA MODULE AND VEHICLE COMPRISING SAME

(71) Applicant: LG Innotek Co., Ltd., Seoul (KR)

(72) Inventors: Sang Yeal Han, Seoul (KR); Jung Mi Kim, Seoul (KR)

(73) Assignee: LG INNOTEK CO., LTD., Seoul (KR)

(*) Notice: Subject to any disclaimer, the term of this patent is extended or adjusted under 35 U.S.C. 154(b) by 0 days.

(21) Appl. No.: 15/750,465

(22) PCT Filed: Aug. 2, 2016

(86) PCT No.: PCT/KR2016/008510
§ 371 (c)(1),
(2) Date: Feb. 5, 2018

(87) PCT Pub. No.: WO2017/023092
PCT Pub. Date: Feb. 9, 2017

(65) Prior Publication Data
US 2018/0224622 A1 Aug. 9, 2018

(30) Foreign Application Priority Data

Aug. 4, 2015 (KR) .................. 10-2015-0110003

(51) Int. Cl.
*G02B 7/02* (2006.01)
*H04N 5/225* (2006.01)
(Continued)

(52) U.S. Cl.
CPC ............. *G02B 7/021* (2013.01); *B60R 11/04* (2013.01); *G02B 7/026* (2013.01); *G02B 7/04* (2013.01);
(Continued)

(58) Field of Classification Search
CPC .......... G02B 7/02; G02B 7/021; G02B 7/026; G02B 7/04; G02B 7/023; H04N 7/18;
(Continued)

(56) References Cited

U.S. PATENT DOCUMENTS 5,052,782 A * 10/1991 Myer ..................... G02B 7/026
359/694
7,965,336 B2 6/2011 Bingle et al.
(Continued)

FOREIGN PATENT DOCUMENTS

| JP | 2004-206110 A | 7/2004 |
|---|---|---|
| KR | 10-2009-0026518 A | 3/2009 |
| KR | 10-2011-0017538 A | 2/2011 |
| KR | 10-2013-0138379 A | 12/2013 |
| KR | 10-2015-0066770 A | 6/2015 |

OTHER PUBLICATIONS

International Search Report in International Application No. PCT/KR2016/008510, filed Aug. 2, 2016.

*Primary Examiner* — Jie Lei
(74) *Attorney, Agent, or Firm* — Saliwanchik, Lloyd & Eisenschenk

(57) ABSTRACT

An embodiment relates to a camera module comprising: a lens module which generates an optical image of an object; a circuit board unit which processes the optical image generated by the lens module and has elements mounted on first and second surfaces thereof; and a cable unit which supplies power to the circuit board unit, wherein the circuit board unit comprises a connector coupled to the cable unit, and wherein the camera module is arranged between the connector and the circuit board unit and fixes the connector on the circuit board unit.

20 Claims, 8 Drawing Sheets

(51) Int. Cl.
  *B60R 11/04* (2006.01)
  *G03B 17/12* (2006.01)
  *G03B 3/02* (2006.01)
  *G02B 7/04* (2006.01)
  *B60R 11/00* (2006.01)

(52) U.S. Cl.
  CPC ............... *G03B 3/02* (2013.01); *G03B 17/12* (2013.01); *H04N 5/2252* (2013.01); *H04N 5/2254* (2013.01); *H04N 5/2257* (2013.01); *B60R 2011/004* (2013.01); *G03B 2217/002* (2013.01)

(58) Field of Classification Search
  CPC ...... H04N 7/185; H04N 5/225; H04N 5/2252; H04N 5/2254; H04N 13/02; H04N 13/0207; H04N 5/2257; B60R 11/04; B60R 2011/004; G03B 17/12; G03B 3/02; G03B 2217/002

USPC ....... 359/808, 818, 819, 611, 703, 704, 740, 359/830
  See application file for complete search history.

(56) References Cited

U.S. PATENT DOCUMENTS

| | | | |
|---|---|---|---|
| 8,878,987 B2 * | 11/2014 | Ma | G02B 7/026 250/239 |
| 2013/0342748 A1 | 12/2013 | Ma et al. | |
| 2014/0063190 A1 * | 3/2014 | Madsen | H04N 13/207 348/46 |
| 2015/0226933 A1 * | 8/2015 | Sugita | G02B 7/028 359/829 |

* cited by examiner

CAMERA MODULE AND VEHICLE COMPRISING SAME

CROSS-REFERENCE TO RELATED APPLICATIONS

This application is the U.S. national stage application of International Patent Application No. PCT/KR2016/008510, filed Aug. 2, 2016, which claims priority to Korean Application No. 10-2015-0110003, filed Aug. 4, 2015, the disclosures of each of which are incorporated herein by reference in their entirety.

TECHNICAL FIELD

Embodiments relate to a camera module and a vehicle including the same.

BACKGROUND ART

A camera module is a kind of image acquisition device that takes an image and converts the taken image into an electrical signal. The camera module may be used in various fields, such as vehicles and crime prevention. For example, the camera module may photograph the surroundings of a vehicle in order to assist a driver in driving safely.

The camera module may include a lens barrel, in which one or more lenses are assembled in a stacked state, and a lens housing for providing a space in which the lens barrel is received.

A screw thread may be formed in the outer circumferential surface of the lens barrel, and a screw thread may also be formed in the inner circumferential surface of the lens housing so as to be engaged with the screw thread formed in the outer circumferential surface of the lens barrel.

That is, the lens barrel is generally inserted into the lens housing by rotating the lens barrel in the state in which the screw thread formed in the outer circumferential surface of the lens barrel is engaged with the screw thread formed in the inner circumferential surface of the lens housing.

At this time, a gap may be formed between the lens barrel and the lens housing due to tolerances of the screw thread formed in the outer circumferential surface of the lens barrel and the screw thread formed in the inner circumferential surface of the lens housing.

The lens barrel may shake due to the gap.

In addition, the lens barrel may droop downward due to the weight of the lens barrel, whereby degradation and imbalance of resolution may occur.

Also, when camera modules are mass-produced, productivity may be reduced in order to adjust the gap between the screw thread formed in the outer circumferential surface of the lens barrel and the screw thread formed in the inner circumferential surface of the lens housing.

DISCLOSURE

Technical Problem

Embodiments provide a camera module that is capable of reducing a gap formed between a lens barrel and a lens housing due to tolerances of a screw thread formed in the outer circumferential surface of the lens barrel and a screw thread formed in the inner circumferential surface of the lens housing and a vehicle including the same.

In addition, embodiments provide a camera module that is capable of preventing the shaking of a lens barrel due to a gap formed between a screw thread formed in the outer circumferential surface of the lens barrel and a screw thread formed in the inner circumferential surface of a lens housing and a vehicle including the same.

In addition, embodiments provide a camera module that is capable of preventing a lens barrel from drooping downward due to the weight of the lens barrel, thereby preventing degradation and imbalance of resolution and a vehicle including the same.

In addition, embodiments provide a camera module that is capable of adjusting a gap formed between a screw thread formed in the outer circumferential surface of a lens barrel and a screw thread formed in the inner circumferential surface of a lens housing when camera modules are mass-produced, thereby improving productivity, and a vehicle including the same.

Technical Solution

In one embodiment, a camera module includes a lens module and a circuit board unit for processing an optical image generated by the lens module, wherein the lens module includes a lens barrel for receiving a plurality of lenses, a lens housing for receiving the lens barrel, and a fixing member for preventing the lens barrel from being displaced in the lens housing in a second direction, which is perpendicular to a first direction, in which the lens barrel is inserted into the lens housing.

The fixing member may be disposed between the lens barrel and the lens housing.

The lens housing may include a rear cap for covering one surface of the lens barrel inserted into the lens housing.

The fixing member may be disposed between the lens barrel and the rear cap.

The fixing member may be an elastic member formed by sequentially stacking a plurality of plates made of an elastic material.

The fixing member may be a single plate made of an elastic material.

One end of the fixing member may be fixed to the rear cap via a fastening member.

The fixing member may be configured such that the cross-sectional areas of the fixing member at arbitrary heights from the lower surface to the upper surface of the fixing member are different from each other.

The cross-sectional area of the lower surface of the fixing member may be greater than the cross-sectional area of the upper surface of the fixing member.

The cross-sectional area of the upper surface of the fixing member may be greater than the cross-sectional area of the lower surface of the fixing member.

In another embodiment, a camera module includes a lens module and a circuit board unit for processing an optical image generated by the lens module, wherein the lens module includes a lens barrel for receiving a plurality of lenses, a lens housing for receiving the lens barrel, the lens housing including a rear cap for covering one surface of the lens barrel inserted thereinto, and a fixing member provided between the rear cap and the rear surface of the lens barrel for applying pressure to the lens barrel.

The fixing member may be configured such that cross-sectional areas of the fixing member at arbitrary heights from the lower surface to the upper surface of the fixing member are different from each other.

The fixing member may be configured such that the sectional area of the fixing member gradually decreases from the rear cap to the lens barrel.

The fixing member may prevent the lens barrel from being displaced in the lens housing in a second direction, which is perpendicular to a first direction, in which the lens barrel is inserted into the lens housing.

The fixing member may be an elastic member formed by sequentially stacking a plurality of plates made of an elastic material.

The fixing member may be a single plate made of an elastic material. In a further embodiment, a vehicle includes a body for defining the external appearance thereof, a camera module disposed at the body for photographing the outside, wherein the camera module includes a lens module and a circuit board unit for processing an optical image generated by the lens module, and wherein the lens module includes a lens barrel for receiving a plurality of lenses, a lens housing for receiving the lens barrel, and a fixing member for preventing the lens barrel from being displaced in the lens housing in a second direction, which is perpendicular to a first direction, in which the lens barrel is inserted into the lens housing.

The fixing member may be disposed between the lens barrel and the lens housing.

The lens housing may include a rear cap for covering one surface of the lens barrel inserted into the lens housing.

The fixing member may be disposed between the lens barrel and the rear cap.

Advantageous Effects

Embodiments have the effect of providing a camera module that is capable of reducing a gap formed between a lens barrel and a lens housing due to tolerances of a screw thread formed in the outer circumferential surface of the lens barrel and a screw thread formed in the inner circumferential surface of the lens housing and a vehicle including the same.

In addition, embodiments have the effect of providing a camera module that is capable of preventing the shaking of a lens barrel due to a gap formed between a screw thread formed in the outer circumferential surface of the lens barrel and a screw thread formed in the inner circumferential surface of a lens housing and a vehicle including the same.

In addition, embodiments have the effect of providing a camera module that is capable of preventing a lens barrel from drooping downward due to the weight of the lens barrel, thereby preventing degradation and imbalance of resolution and a vehicle including the same.

In addition, embodiments have the effect of providing a camera module that is capable of adjusting a gap formed between a screw thread formed in the outer circumferential surface of a lens barrel and a screw thread formed in the inner circumferential surface of a lens housing when camera modules are mass-produced, thereby improving productivity, and a vehicle including the same.

BEST MODE

Reference will now be made in detail to embodiments, examples of which are illustrated in the accompanying drawings. However, the present disclosure may be embodied in many different forms, and should not be construed as being limited to the embodiments set forth herein. Rather, these embodiments are provided so that this disclosure will be thorough and complete, and will fully convey the disclosure to those skilled in the art.

In addition, relational terms, such as "first," "second," "on/upper part/above" and "under/lower part/below," are used only to distinguish between one subject or element and another subject and element, without necessarily requiring or involving any physical or logical relationship or sequence between such subjects or elements.

Figure 1:
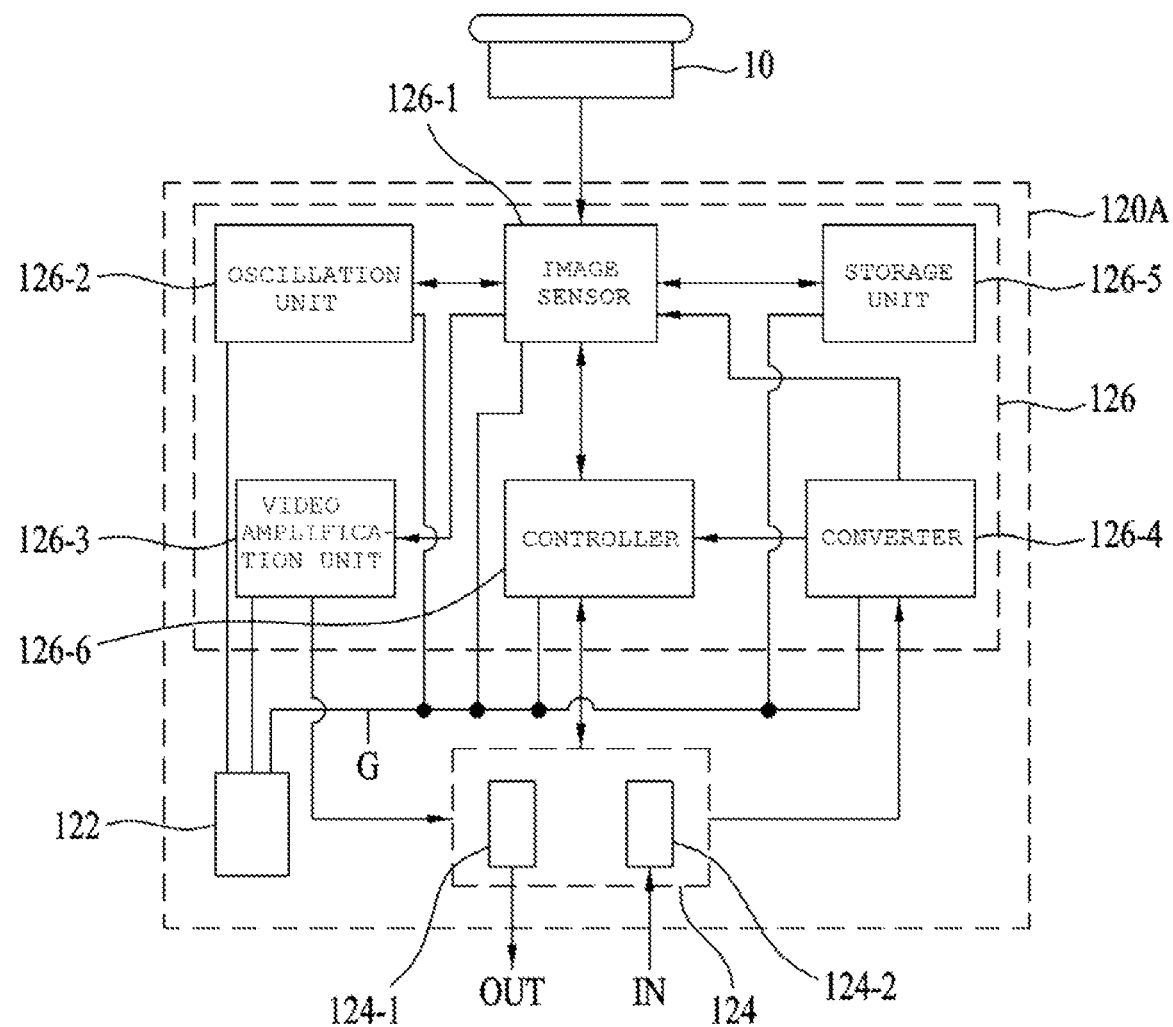
FIG. 1 is a block diagram illustrating a camera module according to an embodiment.

FIG. 1 is a block diagram illustrating a camera module according to an embodiment.

Referring to FIG. 1, the camera module may include a lens module 10. A ground unit 122 may be a body of a circuit board 120A, rather than a separate member. In addition, lines G interconnecting the ground unit 122 and respective units 126-1, 126-2, 126-3, 126-4, 126-5, and 126-6 are virtual electric wires, via which the respective units 126-1, 126-2, 126-3, 126-4, 126-5, and 126-6 are electrically connected to the ground unit 122. A connection unit 124 is not electrically connected to the ground unit 122. The reason for this is that the connection unit 124 is electrically isolated from the ground unit 122.

The circuit board 120A shown in FIG. 1 may include an image sensor 126-1, an oscillation unit 126-2, a video amplification unit 126-3, a converter 126-4, a storage unit 126-5, and a controller 126-6.

First, the lens module 10 transmits an image of a subject to be photographed to the image sensor 126-1.

In response to a clock signal, the image sensor 126-1 may convert an optical image generated by the lens module 10 into an electrical image signal, and may output the converted electrical image signal to the video amplification unit 126-3.

The oscillation unit 126-2 may generate a clock signal, and may output the generated clock signal to the image sensor 126-1.

The video amplification unit 126-3 may amplify the electrical image signal generated by the image sensor 126-1, and may output the amplification result through a signal input/output terminal 124-1 (OUT) of the connection unit 124 as a video signal.

The converter 126-4 may convert the level of power received from an external device (not shown) through a power input terminal 124-2 (IN) of the connection unit 124 into the level of power necessary for the circuit board 120A, and may output power having the converted level to the respective units 126-1 to 126-6. To this end, the converter 126-4 may include at least one of a DC-DC converter (not shown) or a low-voltage dropout (LDO) regulator (not shown).

In addition, the storage unit 126-5 may be connected to the image sensor 126-1, and may temporarily store the electrical image signal generated by the image sensor 126-1. To this end, flash memory may be used as the storage unit 126-5.

The controller 126-6 may control at least one of the image sensor 126-1 or the converter 126-4.

As shown in FIG. 1, the connection unit 124 is electrically isolated from the ground unit 122. Even when electrostatic discharge is introduced into the connection unit 124 via a housing and a metal of a connector, therefore, the respective units 126-1 to 126-6 may be protected from the electrostatic discharge.

The circuit board 120A of the camera module shown in FIG. 1 is merely an example given to describe the respective units 126-1 to 126-6 of the circuit board 120A, which are protected from electrostatic discharge. Consequently, the disclosure is not limited thereto, regardless of the kind of functional device that is included in the circuit board 120A of the camera module 100 according to the embodiment.

Figure 2:
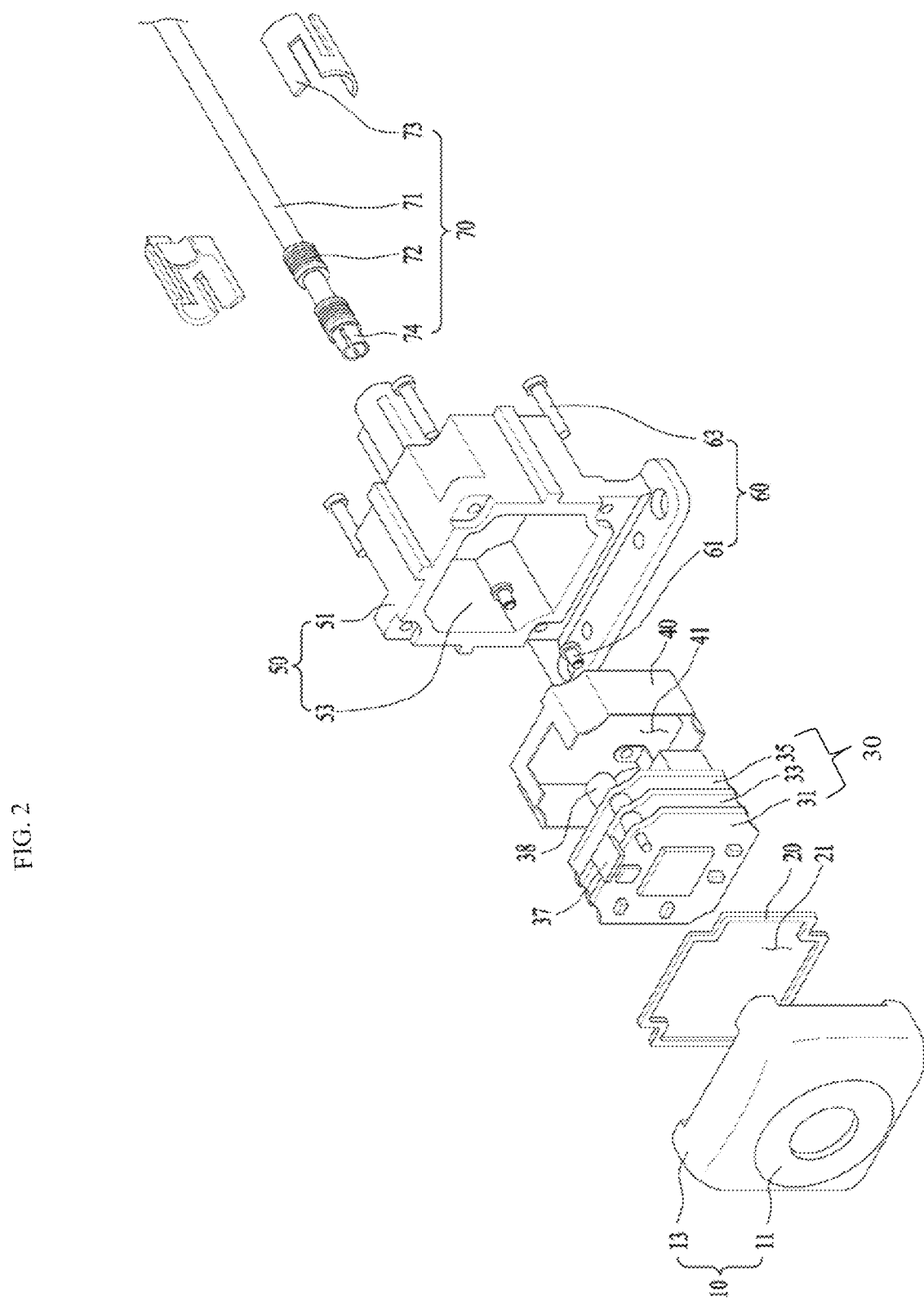
FIG. 2 is an exploded perspective view showing the camera module according to the embodiment.

FIG. 2 is an exploded perspective view showing the camera module according to the embodiment.

Referring to FIG. 2, the camera module according to this embodiment may include a lens module 10 for generating an optical image of an object, a circuit board unit 30 for processing the optical image of the object generated by the lens module 10, a gasket 20 provided between the lens module 10 and the circuit board unit 30 for fixing the circuit board unit 30 without interference between the circuit board unit 30 and the lens module 10, a shield unit 40 disposed at the outer circumferential surface of the circuit board unit 30 for protecting the circuit board unit 30 from external impacts, a rear body 50 for defining a space in which the shield unit 40 and the circuit board unit 30 are received, and a cable unit 70 extending through the rear body 50 for supplying power to the circuit board unit 30.

The lens module 10 may include a lens barrel 11 for processing light incident from the object and a lens housing 13 for receiving the lens barrel 11.

The gasket 20 may be disposed between the lens module 10 and the circuit board unit 30. The gasket 20 may be provided in the central part thereof with a gasket opening 21, which has sufficient area to allow the circuit board unit 30 to pass therethrough.

The circuit board unit 30 may include a first circuit board 31 for converting an optical image generated by the lens module 10 into an electrical image, a second circuit board 33 for processing the electrical image converted by the first circuit board 31, and a third circuit board 35 for supplying power to the first circuit board 31, the second circuit board 33, and the lens module 10.

In addition, each of the circuit boards 31, 33, and 35 may include at least one flexible board unit 37, via which the circuit boards 31, 33, and 35 can be electrically connected to each other.

The first circuit board 31 may include an image sensor (not shown) for converting an optical image into an electrical image. In addition, the second circuit board 33 may include an image signal processor (ISP) chip for processing the electrical image converted by the first circuit board 31.

When the image sensor (not shown) recognizes an image, the ISP digitizes and analyzes the recognized image. The ISP is obvious to those skilled in the art, and therefore a detailed description thereof will be omitted.

The third circuit board 35 may include a connector 38 disposed to be electrically connected to the cable unit 70, which receives and supplies power from a power source outside the camera module.

The shield unit 40 may be formed in a hollow shape in order to surround the outer circumferential surface of the circuit board unit 30 and thus to protect the circuit board unit 30 from external impacts. The shield unit 40 may include at least a shield opening 41 having an area equal to or greater than the sectional area of the circuit board unit 30.

In addition, the shield unit 40 and the circuit board unit 30 may be coupled to each other via a plurality of first coupling members 61. To this end, the shield unit 40 may have formed therein a plurality of shield holes (not shown).

However, the coupling relationship between the shield unit 40 and the circuit board unit 30 of this embodiment is merely illustrative, and the method of coupling therebetween may be changed as needed.

The rear body 50 may include a rear body housing 51, which defines the external appearance thereof, a rear body opening 53 provided in one surface of the rear body housing 51 for providing a space in which the circuit board unit 30 and the shield unit 40, which is disposed to surround the outer circumferential surface of the circuit board unit 30, are received, and a rear body hole (not shown), through which a second coupling member 63 is inserted in order to couple the lens module 10 to the rear body 50.

The coupling relationship between the rear body 50 and the lens module 10 is merely illustrative, and the method of coupling therebetween may be changed by a user. Consequently, the disclosure is not limited thereto.

The cable unit 70 may include a cable 71 for supplying power from an external power source to the circuit board unit 30, a cable seal 72 disposed on the outer circumferential surface of the cable 72 for sealing the cable 71, a cable holder 73 disposed on the outer circumferential surface of the cable 72 for fixing the cable 71, and a cable connector 74 disposed to be electrically connected to the connector 38 of the circuit board unit 30.

Figure 3A:
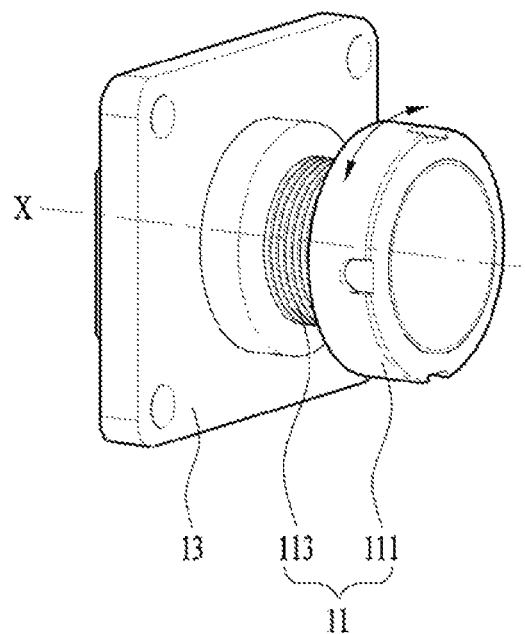
FIGS. 3*a* and 3*b* are views showing a lens module according to an embodiment.
Figure 3B:
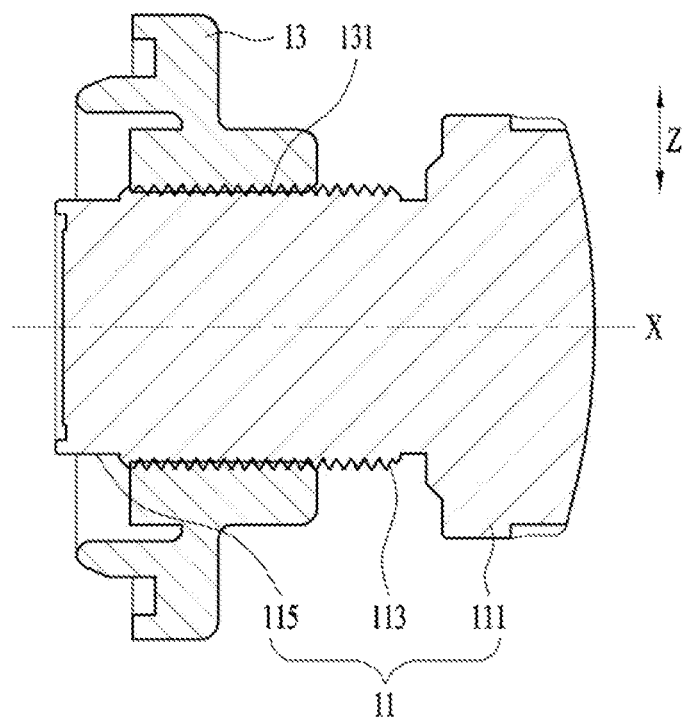

FIGS. 3a and 3b are views showing a lens module according to an embodiment.

Referring to FIGS. 3a and 3b, the lens module 10 according to the embodiment may include a lens barrel 11 for receiving a plurality of lenses to collect light incident from the outside and a lens housing 13 for providing a space in which the lens barrel 11 is received.

The lens barrel 11 may include a body 111, which defines the external appearance thereof, a barrel screw thread 113 formed in the portion thereof that is inserted into the lens housing 13 so as to protrude to a predetermined height, and a step 115 provided at the end of the barrel screw thread 113 that is inserted into the lens housing 13.

As shown in FIG. 3b, the barrel screw thread 113 of the embodiment may be formed only in a portion of the outer circumferential surface of the lens barrel 11. Alternatively, the barrel screw thread 113 may be formed in the entirety of the outer circumferential surface of the lens barrel 11.

The lens housing 13 may include a housing screw thread 131 formed in the inner circumferential surface of the lens housing 13 so as to be engaged with the barrel screw thread 113.

It is sufficient for the housing screw thread 131 and the barrel screw thread 113 to be engaged with each other as the lens barrel 11 moves into the lens housing 13. The housing screw thread 131 may be a female screw thread, and the barrel screw thread 113 may be a male screw thread. Alternatively, the housing screw thread 131 may be a male screw thread, and the barrel screw thread 113 may be a female screw thread.

In addition, as shown, each of the housing screw thread 131 and the barrel screw thread 113 of the embodiment may have a triangular section. However, the disclosure is not limited thereto. Each of the housing screw thread 131 and the barrel screw thread 113 may be formed in the sectional shape of a circle, an oval, or a polygon.

The lens barrel 11 may be inserted into the lens housing 13 in a first direction, i.e. in the X-axis direction.

In addition, the lens barrel 11 may be rotated in the direction indicated by the arrow shown in the figure such that the lens barrel 11 is inserted into the lens housing 13.

Figure 4A:
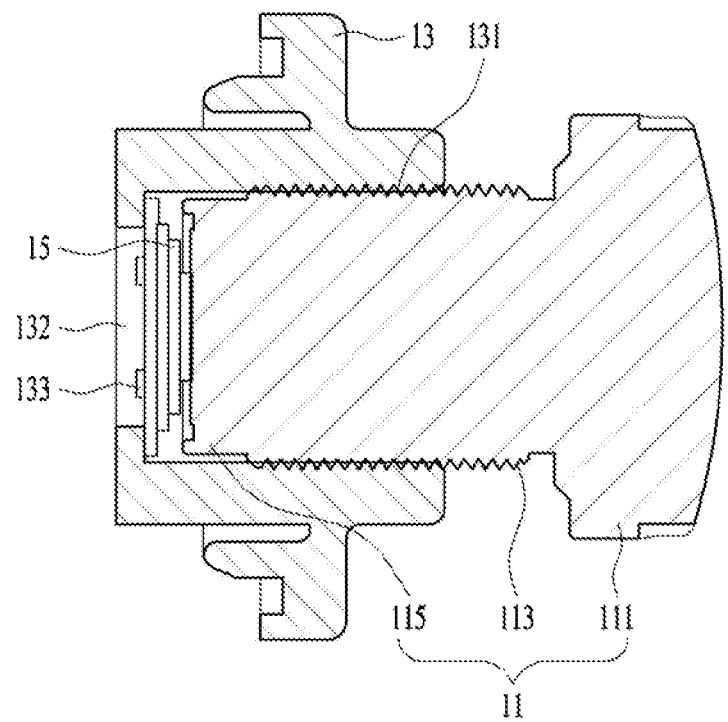
FIGS. 4*a* and 4*b* are views showing an embodiment of a lens barrel, a lens housing, and a fixing member.
Figure 4B:
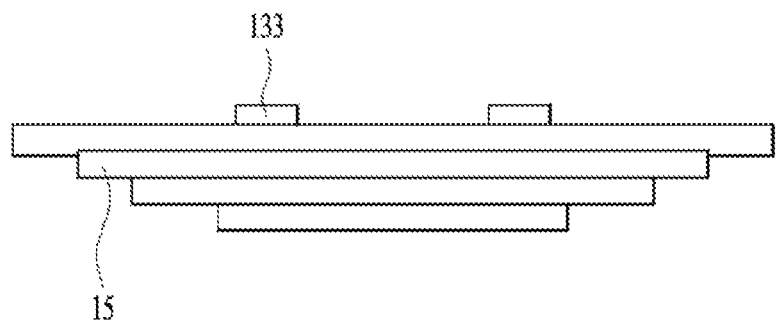

FIGS. 4a and 4b are views showing an embodiment of the lens barrel, the lens housing, and the fixing member.

Referring to FIGS. 4a and 4b, the lens module 10 according to the embodiment may include a lens barrel 11 for receiving a plurality of lenses to collect light incident from the outside and a lens housing 13 for providing a space in which the lens barrel 11 is received.

The lens barrel 11 may include a body 111, which defines the external appearance thereof, a barrel screw thread 113 formed in the portion thereof that is inserted into the lens housing 13 so as to protrude a predetermined height, and a step 115 provided at the end of the barrel screw thread 113 that is inserted into the lens housing 13.

The lens housing 13 may include a housing screw thread 131 formed in the inner circumferential surface of the lens housing 13 so as to be engaged with the barrel screw thread 113, a rear cap 132 provided at the rear of the lens housing 13 for covering one surface of the lens barrel 11 that is inserted into the lens housing 13, a fixing member 15 provided between the rear cap 132 and the rear surface of the lens barrel 11 for applying pressure to the lens barrel 11, and a fastening member 133 for fastening the rear cap 132 and the fixing member 15 to each other.

The fixing member 15 may be disposed between the rear cap 132 and the fastening member 133. In this embodiment, the fixing member 15 may be a leaf spring.

The leaf spring is an elastic member formed by sequentially stacking a plurality of plates made of an elastic material.

In the case in which a leaf spring is used as the fixing member 15, repulsive force based on action and reaction is generated between the rear cap 132 and the fastening member 133. As a result, force is applied in the direction that is opposite the direction in which the lens barrel 11 is inserted into the lens housing 13, whereby it is possible to prevent the lens barrel 11 inserted into the lens housing 13 from drooping due to the weight thereof.

The fixing member 15 may be configured such that the sectional area of the fixing member gradually decreases from the rear cap 132 to the lens barrel 11.

That is, the sectional area of the portion of the fixing member 15 that contacts the rear cap 132 may be the largest, and the sectional area of the portion of the fixing member 15 that contacts the lens barrel 11 may be the smallest.

However, the above embodiment is merely illustrative, and therefore the disclosure is not limited thereto. Alternatively, the fixing member 15 may be configured such that the sectional area of the fixing member gradually increases from the rear cap 132 to the lens barrel 11.

The fixing member 15 may be fixed to the rear cap 132 via at least one fastening member 133.

Alternatively, the fixing member 15 may be directly fastened to the lens housing 13 without being fixed to the rear cap 132.

Figure 5A:
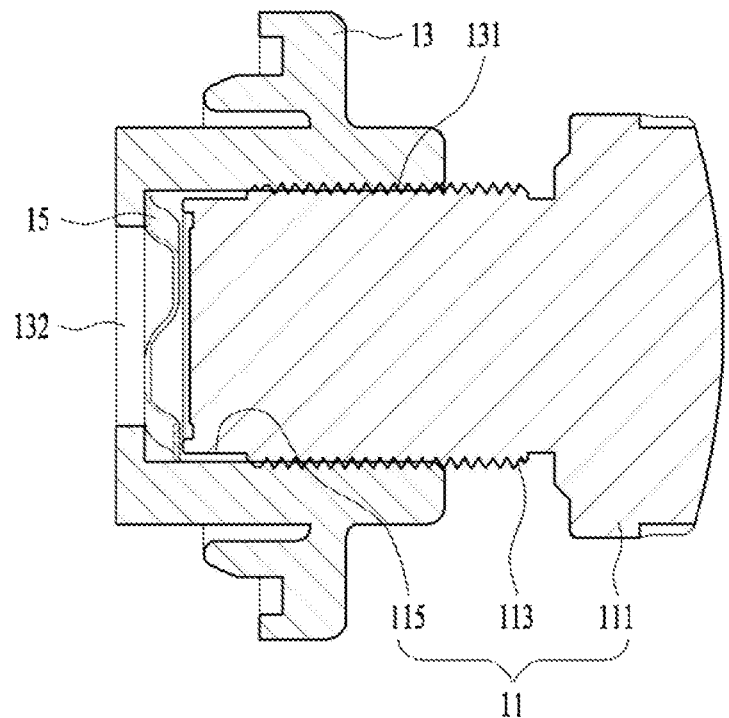
FIGS. 5*a*, 5*b*, and 5*c* are views showing another embodiment of the lens barrel, the lens housing, and the fixing member.
Figure 5B:
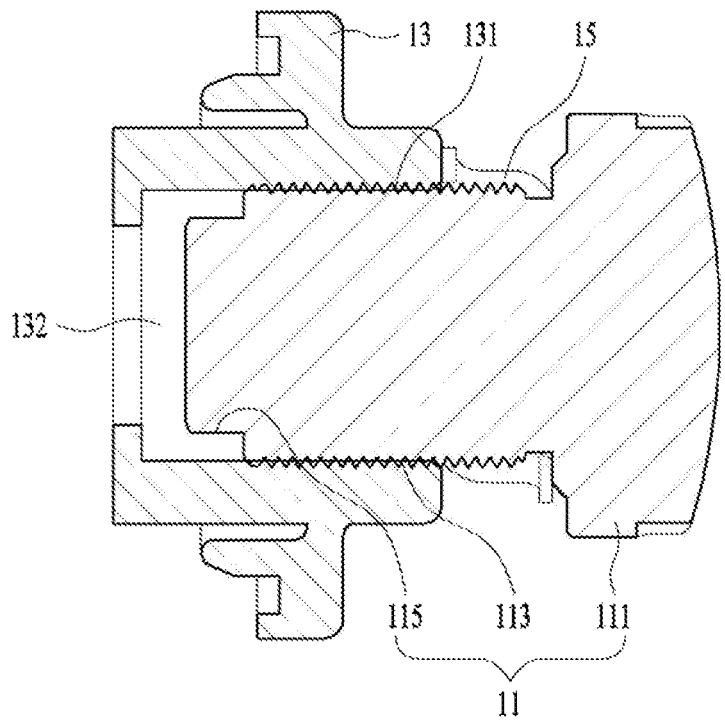
Figure 5C:
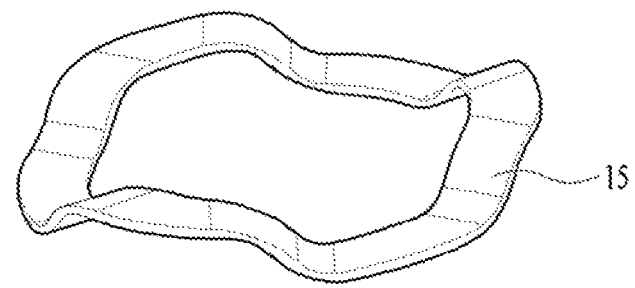

FIGS. 5a, 5b, and 5c are views showing another embodiment of the lens barrel, the lens housing, and the fixing member.

Referring to FIGS. 5a, 5b, and 5c, the lens module 10 according to the embodiment may include a lens barrel 11 for receiving a plurality of lenses to collect light incident from the outside and a lens housing 13 for providing a space in which the lens barrel 11 is received.

The lens barrel 11 may include a body 111, which defines the external appearance thereof, a barrel screw thread 113 formed in the portion thereof that is inserted into the lens housing 13 so as to protrude to a predetermined height, and a step 115 provided at the end of the barrel screw thread 113 that is inserted into the lens housing 13.

The lens housing 13 may include a housing screw thread 131 formed in the inner circumferential surface of the lens housing 13 so as to be engaged with the barrel screw thread 113, a rear cap 132 provided at the rear of the lens housing 13 for covering one surface of the lens barrel 11 inserted into the lens housing 13, a fixing member 15 provided between the rear cap 132 and the rear surface of the lens barrel 11 for applying pressure to the lens barrel 11, and a fastening member 133 for fastening the rear cap 132 and the fixing member 15 to each other.

The fixing member 15 may be disposed between the rear cap 132 and the fastening member 133. In this embodiment, the fixing member 15 may be a single plate spring.

In the case in which a single plate spring is used as the fixing member 15, repulsive force based on action and reaction is generated between the rear cap 132 and the fastening member 133. As a result, force is applied in the direction that is opposite the direction in which the lens barrel 11 is inserted into the lens housing 13, whereby it is possible to prevent the lens barrel 11 inserted into the lens housing 13 from drooping due to the weight thereof.

In addition, the fixing member 15 may be disposed between the lens housing 13 and the lens barrel 11.

In the case in which the fixing member 15 is disposed between the lens housing 13 and the lens barrel 11, repulsive force based on action and reaction is generated between the lens housing 13 and the lens barrel 11. As a result, force is applied in the direction that is opposite the direction in which the lens barrel 11 is inserted into the lens housing 13, whereby it is possible to prevent the lens barrel 11 inserted into the lens housing 13 from drooping due to the weight thereof.

In this embodiment, the fixing member 15 may be a single plate spring. As shown in FIG. 5c, the single plate spring is a kind of elastic member configured to have a single plane and to have a predetermined height difference between the upper surface and the lower surface thereof such that elastic force is generated due to the height difference.

The single plate spring is lighter than the leaf spring shown in FIG. 4. Furthermore, no friction occurs between plates, unlike the leaf spring, whereby the intensity of a sound resulting from friction is reduced.

In addition, the fastening member 133 is additionally provided in order to fasten the leaf spring. In the case in which the single plate spring is used, however, the single plate spring is mounted to the lens module 10 without using the fastening member 133, whereby the assembly process is simplified.

In addition, the single plate spring exhibits higher elastic force than the leaf spring. Consequently, higher elastic force is applied in the direction that is opposite the direction in which the lens barrel 11 is inserted, whereby distance adjustment is possible.

Figure 6:
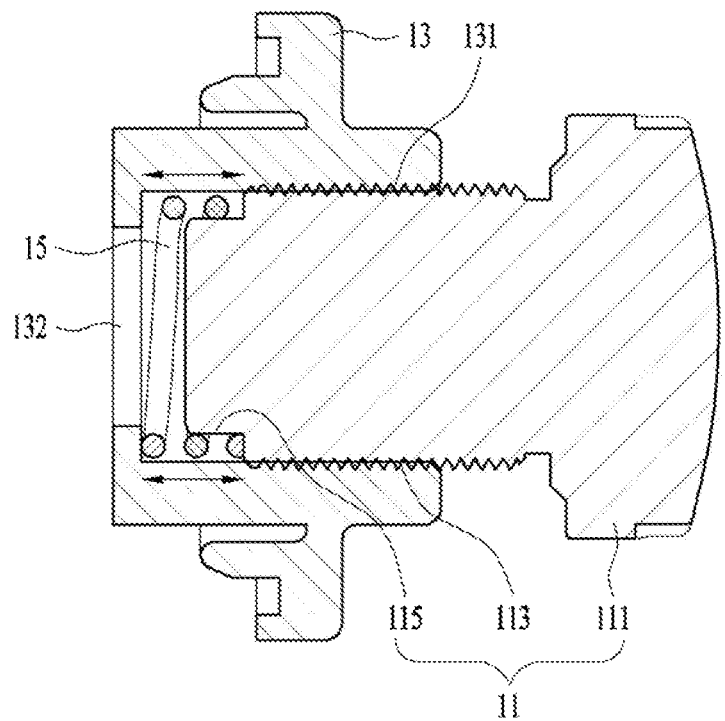
FIG. 6 is a view showing a further embodiment of the lens barrel, the lens housing, and the fixing member.

FIG. 6 is a view showing a further embodiment of the lens barrel, the lens housing, and the fixing member.

Referring to FIG. 6, the lens module 10 according to the embodiment may include a lens barrel 11 for receiving a plurality of lenses to collect light incident from the outside and a lens housing 13 for providing a space in which the lens barrel 11 is received.

The lens barrel 11 may include a body 111, which defines the external appearance thereof, a barrel screw thread 113 formed in the portion thereof that is inserted into the lens housing 13 so as to protrude to a predetermined height, and a step 115 provided at the end of the barrel screw thread 113 that is inserted into the lens housing 13.

The lens housing 13 may include a housing screw thread 131 formed in the inner circumferential surface of the lens housing 13 so as to be engaged with the barrel screw thread 113, a rear cap 132 provided at the rear of the lens housing 13 for covering one surface of the lens barrel 11 inserted into the lens housing 13, a fixing member 15 provided between the rear cap 132 and the rear surface of the lens barrel 11 for applying pressure to the lens barrel 11, and a fastening member 133 for fastening the rear cap 132 and the fixing member 15 to each other.

The fixing member 15 may be disposed between the rear cap 132 and the fastening member 133. In this embodiment, the fixing member 15 may be a coil spring.

In the case in which a coil spring is used as the fixing member 15, repulsive force based on action and reaction is generated between the rear cap 132 and the fastening member 133. As a result, force is applied in the direction that is opposite the direction in which the lens barrel 11 is inserted into the lens housing 13, whereby it is possible to prevent the lens barrel 11 inserted into the lens housing 13 from drooping due to the weight thereof.

In addition, although not shown in the figure, the fixing member 15 may be disposed between the lens housing 13 and the lens barrel 11.

In the case in which the fixing member 15 is disposed between the lens housing 13 and the lens barrel 11, repulsive force based on action and reaction is generated between the lens housing 13 and the lens barrel 11. As a result, force is applied in the direction that is opposite the direction in which the lens barrel 11 is inserted into the lens housing 13, whereby it is possible to prevent the lens barrel 11 inserted into the lens housing 13 from drooping due to the weight thereof.

FIG. 7 shows the fixing member according to the embodiment of FIG. 6.

Figure 7A:
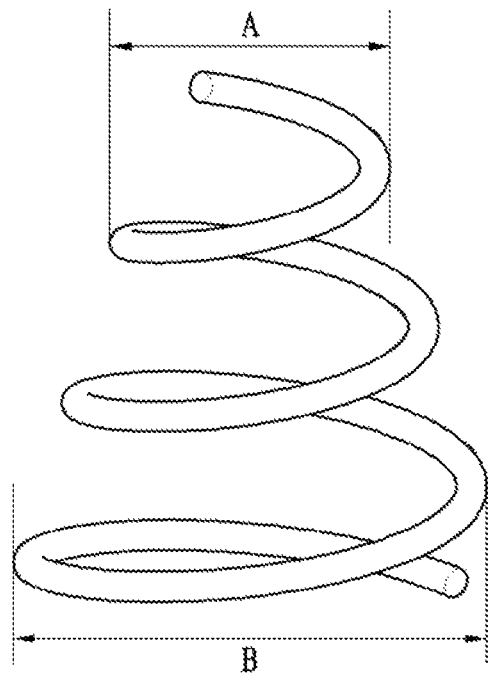
FIGS. 7*a* and 7*b* are views showing the fixing member according to the embodiment of FIG. 6.
Figure 7B:
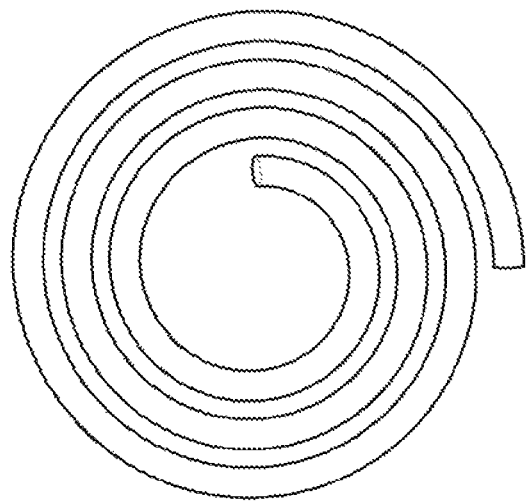

Referring to FIGS. 7a and 7b, the fixing member 15 may be configured such that the sectional area of the fixing member gradually decreases moving upward.

As previously described, the fixing member 15 may be a coil spring.

On the assumption that the cross-sectional area of the lower surface of the fixing member 15 is B and the cross-sectional area of the upper surface of the fixing member 15 is A, the fixing member may be configured such that a plurality of cross-sectional areas, which are formed as a coil extends upward while being wound, gradually decrease from B to A at predetermined intervals.

In other words, the fixing member 15 is configured such that the cross-sectional area of the fixing member gradually decreases and such that the cross-sectional areas of the fixing member at arbitrary heights are different from each other.

In the case in which the cross-sectional area of the upper surface of the fixing member 15 and the cross-sectional area of the lower surface of the fixing member 15 are the same as each other or in the case in which two or more cross-sectional areas of the fixing member 15 at arbitrary heights from the lower surface to the upper surface of the fixing member 15 are the same as each other, the parts of the fixing member 15 may come into contact with each other when a high load is applied to the fixing member 15. As a result, the fixing member 15 may be damaged, or a metal friction sound may be generated due to friction between the parts of the fixing member 15.

Consequently, the fixing member is configured such that the cross-sectional area of the fixing member gradually decreases and such that the cross-sectional areas of the fixing member at arbitrary heights are different from each other, whereby it is possible to prevent damage to the fixing member 15 and to prevent metal friction sound from being generated due to friction.

Figure 8:
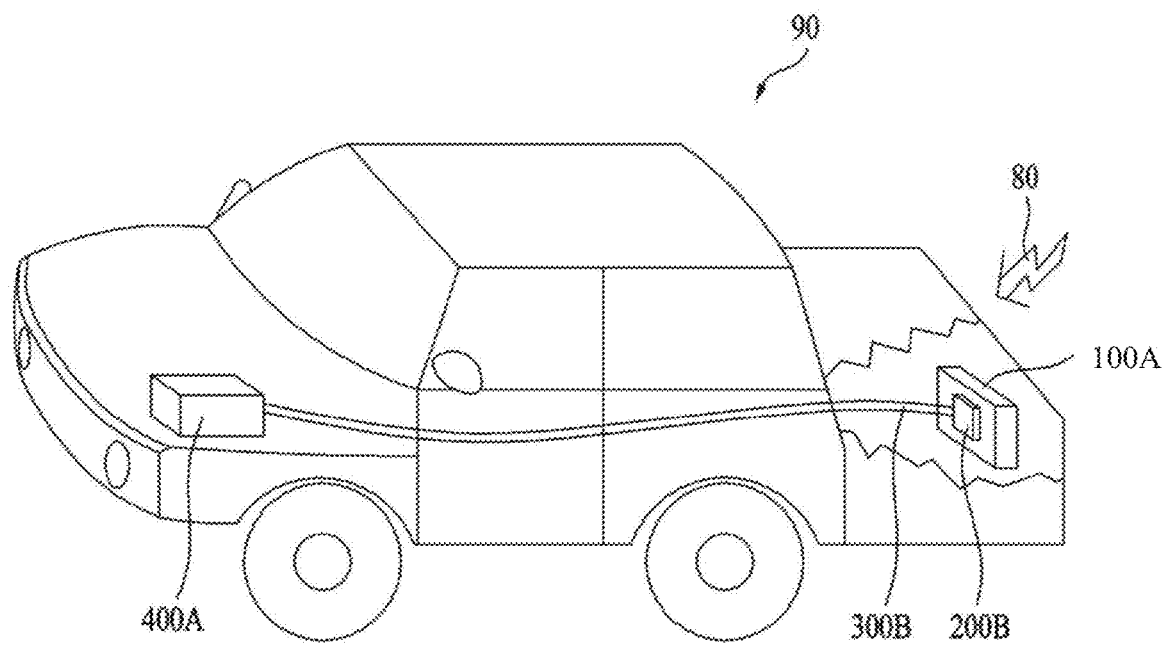
FIG. 8 is a partially cutaway perspective view showing a vehicle equipped with a camera module according to an embodiment.

FIG. 8 is a partially cutaway perspective view showing a vehicle 90 equipped with a camera module according to an embodiment.

Referring to FIG. 8, the vehicle 90 may include a camera module, a connector 200B, a cable 300B, and an external device 400A.

In one embodiment, the external device 400A may include a battery for supplying power to respective units of the vehicle. Power may be supplied from the battery 400A to the camera module 100A via the cable 300B and the connector 200B. The connector 200B may be connected to the circuit board unit 30, shown in FIG. 2, in the camera module 100A.

In another embodiment, the external device 400A may include an electronic control unit (ECU) for analyzing an image around the vehicle 90. In general, a vehicle includes various kinds of ECUs. An ECU is a kind of computer having therein software capable of performing various functions for the vehicle. Consequently, the ECU included in the external device 400A may be a computer for analyzing an image around the vehicle 90. In this case, the connector 200B may transmit the image around the vehicle, generated by the camera module 100A, to the ECU 400A via the cable 300B.

If the cable 300B is too short, electrostatic discharge 80 may be extinguished through the cable 300B. Consequently, in the case in which the cable 300B is too long, for example 10 cm to 15 cm, it is possible to protect a circuit board 120 of the camera module 100A.

Also, in the case in which the external device 400A includes both the battery and the ECM, the camera module 100A may serve as a rear monitoring camera of the vehicle 90, as shown in FIG. 8. However, the disclosure is not limited thereto. In another embodiment, the camera module may serve as a front monitoring camera of the vehicle 90, unlike what is shown in FIG. 8.

Although embodiments have been described with reference to a number of illustrative embodiments thereof, it should be understood that the embodiments are illustrative and not restrictive, and that numerous other modifications and applications may be devised by those skilled in the art that will fall within the intrinsic aspects of the embodiments. For example, various variations and modifications are possible in concrete constituent elements of the embodiments. In addition, it is to be understood that differences relevant to the variations and modifications fall within the spirit and scope of the present disclosure, which is defined in the appended claims.

MODE FOR INVENTION

Various embodiments have been described in the best mode for carrying out the invention.

INDUSTRIAL APPLICABILITY

The camera module according to the embodiments may be provided in a vehicle in order to photograph an image around the vehicle without shaking, even during the travel of the vehicle.

The invention claimed is:

1. A camera module comprising:
a lens module; and
a circuit board unit for processing an optical image generated by the lens module, wherein
the lens module comprises:
a lens barrel for receiving a plurality of lenses;
a lens housing for receiving the lens barrel; and
a fixing member disposed in the lens housing for inhibiting the lens barrel from being displaced in the lens housing in a second direction, which is perpendicular to a first direction in which the lens barrel is inserted into the lens housing,
wherein the lens housing comprises a rear cap for covering one surface of the lens barrel inserted into the lens housing,
wherein the fixing member comprises a plurality of fixing member units having different sectional areas to form a staircase shape, and
wherein the fixing member is disposed between the lens barrel and the rear cap to support the lens barrel, a lateral surface of the fixing member surface-contacting a lateral surface of the rear cap.

2. The camera module according to claim 1, wherein the fixing member is an elastic member formed by sequentially stacking a plurality of plates made of an elastic material.

3. The camera module according to claim 1, wherein the fixing member is a single plate or a coil spring made of an elastic material.

4. The camera module according to claim 1, wherein one end of the fixing member is fixed to the rear cap via a fastening member.

5. The camera module according to claim 1, wherein the fixing member is configured such that cross-sectional areas of the fixing member at arbitrary heights from a lower surface to an upper surface of the fixing member are different from each other.

6. The camera module according to claim 5, wherein the cross-sectional area of the lower surface of the fixing member is greater than the cross-sectional area of the upper surface of the fixing member.

7. The camera module according to claim 5, wherein the cross-sectional area of the upper surface of the fixing member is greater than the cross-sectional area of the lower surface of the fixing member.

8. The camera module according to claim 1, wherein the lens housing comprises a housing screw thread formed in an inner circumferential surface of the lens housing to be engaged with a barrel screw thread.

9. The camera module according to claim 1, wherein a fastening member is disposed to couple the rear cap and the fixing member to each other.

10. The camera module according to claim 1, wherein the fixing member is a leaf spring made of an elastic material.

11. A camera module comprising:
a lens module; and
a circuit board unit for processing an optical image generated by the lens module, wherein
the lens module comprises:
a lens barrel for receiving a plurality of lenses;
a lens housing for receiving the lens barrel, the lens housing comprising a rear cap for covering one surface of the lens barrel inserted thereinto; and
a fixing member provided between the rear cap and a rear surface of the lens barrel for applying pressure to the lens barrel, a lateral surface of the fixing member surface-contacting a lateral surface of the rear cap,
wherein the fixing member comprises a plurality of fixing member units having different sectional areas to form a staircase shape.

12. The camera module according to claim 11, wherein the fixing member is configured such that cross-sectional areas of the fixing member at arbitrary heights from a lower surface to an upper surface of the fixing member are different from each other.

13. The camera module according to claim 11, wherein the fixing member is configured such that a sectional area of the fixing member gradually decreases from the rear cap to the lens barrel.

14. The camera module according to claim 11, wherein the fixing member inhibits the lens barrel from being displaced in the lens housing in a second direction, which is perpendicular to a first direction in which the lens barrel is inserted into the lens housing.

15. The camera module according to claim 11, wherein the fixing member is an elastic member formed by sequentially stacking a plurality of plates made of an elastic material.

16. The camera module according to claim 11, wherein the fixing member is a single plate or a coil spring made of an elastic material.

17. A vehicle comprising:
a body for defining an external appearance thereof;
a camera module disposed at the body for photographing an outside, wherein
the camera module comprises:
a lens module; and
a circuit board unit for processing an optical image generated by the lens module, and wherein
the lens module comprises:
a lens barrel for receiving a plurality of lenses;
a lens housing for receiving the lens barrel; and
a fixing member disposed in the lens housing for inhibiting the lens barrel from being displaced in the lens housing in a second direction, which is perpendicular to a first direction in which the lens barrel is inserted into the lens housing,
wherein the lens housing comprises a rear cap for covering one surface of the lens barrel inserted into the lens housing,
wherein the fixing member comprises a plurality of fixing member units having different sectional areas to form a staircase shape, and
wherein the fixing member is disposed between the lens barrel and the rear cap to support the lens barrel, a lateral surface of the fixing member surface contacting a lateral surface of the rear cap.

18. The camera module according to claim 17, wherein the lens housing comprises a housing screw thread formed in an inner circumferential surface of the lens housing to be engaged with a barrel screw thread.

19. The camera module according to claim 17, wherein a fastening member is disposed to couple the rear cap and the fixing member to each other.

20. The camera module according to claim 17, wherein the fixing member is a leaf spring made of an elastic material.

* * * * *